United States Patent
Yung et al.

(10) Patent No.: US 9,825,920 B1
(45) Date of Patent: Nov. 21, 2017

(54) SYSTEMS AND METHODS FOR MULTI-FUNCTION AND MULTI-PURPOSE CRYPTOGRAPHY

(71) Applicant: GOOGLE INC., Mountain View, CA (US)

(72) Inventors: Marcel M. M. Yung, New York, NY (US); Nunzio Thron, New York, NY (US); Gang Wang, Frederick, MD (US)

(73) Assignee: GOOGLE LLC, Mountain View, CA (US)

(*) Notice: Subject to any disclaimer, the term of this patent is extended or adjusted under 35 U.S.C. 154(b) by 102 days.

(21) Appl. No.: 14/930,555

(22) Filed: Nov. 2, 2015

Related U.S. Application Data

(63) Continuation-in-part of application No. 13/975,365, filed on Aug. 25, 2013, now Pat. No. 9,178,855.

(51) Int. Cl.
  *H04L 9/32* (2006.01)
  *H04L 29/06* (2006.01)

(52) U.S. Cl.
  CPC ............... *H04L 63/0428* (2013.01)

(58) Field of Classification Search
  CPC .................................................. H04L 63/0428
  USPC .......................................................... 713/168
  See application file for complete search history.

(56) References Cited

U.S. PATENT DOCUMENTS

| | | | |
|---|---|---|---|
| 7,827,403 B2 * | 11/2010 | Wong | G06F 21/6227 380/282 |
| 8,156,548 B2 | 4/2012 | Magdi et al. | |
| 8,341,401 B1 | 12/2012 | Kaufman et al. | |
| 8,811,620 B2 * | 8/2014 | Chaves | H04L 9/0866 380/277 |
| 2006/0010324 A1 * | 1/2006 | Appenzeller | H04L 9/0866 713/171 |
| 2008/0008319 A1 * | 1/2008 | Poirier | H04L 9/0866 380/228 |
| 2012/0159159 A1 | 6/2012 | Messerges et al. | |
| 2012/0246463 A1 * | 9/2012 | Shea | H04L 63/061 713/153 |

(Continued)

OTHER PUBLICATIONS

After Final Consideration Pilot Search Results as attached with the Notice of Allowance, Jun. 30, 2015.

*Primary Examiner* — Morshed Mehedi
*Assistant Examiner* — Khalil Naghdali
(74) *Attorney, Agent, or Firm* — Procopio, Cory, Hargreaves & Savitch LLP

(57) ABSTRACT

A computer-implemented method is provided that includes propagating a first identifier and a first key to one or more cipher engines on a computing system, the one or more cipher engines configured to perform at least one of decryption and encryption based on a first cryptographic scheme from a plurality of cryptographic schemes identified by the first identifier, and the first key; on expiration of the first identifier and the first key, propagating a second identifier and a second key to the one or more cipher engines on the computing system and instructions for configuring the one or more cipher engines to change the first cryptographic scheme to a second cryptographic scheme based on the second identifier and the second key; and setting a time window beyond the expiration for acceptance of messages encrypted in the first cryptographic scheme and messages encrypted in the second cryptographic scheme.

14 Claims, 10 Drawing Sheets

(56) References Cited

U.S. PATENT DOCUMENTS

| | | | |
|---|---|---|---|
| 2013/0287210 A1 | 10/2013 | Matsuda et al. | |
| 2013/0290712 A1* | 10/2013 | Zaverucha | H04L 9/3252 713/168 |
| 2013/0297929 A1* | 11/2013 | Chaves | H04L 9/0844 713/150 |
| 2014/0053346 A1* | 2/2014 | Lagrange | A61K 8/347 8/408 |
| 2014/0059346 A1* | 2/2014 | Campagna | H04W 12/02 713/168 |
| 2016/0036785 A1* | 2/2016 | Ambroz | H04L 63/068 713/170 |

* cited by examiner

SYSTEMS AND METHODS FOR MULTI-FUNCTION AND MULTI-PURPOSE CRYPTOGRAPHY

This application is a Continuation-in-part of, and claims priority benefit to, U.S. patent application Ser. No. 13/975,365, filed on Aug. 25, 2013, to be issued on Nov. 3, 2015 as U.S. Pat. No. 9,178,855, the contents of which is incorporated herein by reference in its entirety.

BACKGROUND

Field

The subject matter discussed herein relates generally to data processing and, more particularly, to systems and methods for multi-function and multi-purpose cryptography.

Related Background

Data is frequently transmitted on a public medium (e.g., on the Internet) in one encrypted form or another. Data encryption may be done using a public key that involves a trusted third party (e.g., a certificate authority) or a private key shared with a communication partner.

Communications with different partners and/or different types of messages typically involves developing and/or using different cryptographic software and/or or devices, each is developed for communicating with a specific partner specific messages. Changing or modifying a communication (e.g., to use a new encryption of old message or a new message that need to be encrypted, a different encryption key, etc.) typically involves stopping the affected communication software (including the cipher operation), modifying it, then restarting it. To implement a new communication link with a new partner typically involves developing new software or changing existing software to handle the new encrypted communication link.

SUMMARY

According to an example implementation, the subject matter includes methods of multi-function and multi-purpose cryptography, propagating a first identifier and a first key to one or more cipher engines on a computing system, the one or more cipher engines configured to perform at least one of decryption and encryption based on a first cryptographic scheme from a plurality of cryptographic schemes identified by the first identifier, and the first key; on expiration of the first identifier and the first key, propagating a second identifier and a second key to the one or more cipher engines on the computing system and instructions for configuring the one or more cipher engines to change the first cryptographic scheme to a second cryptographic scheme based on the second identifier and the second key; and setting a time window beyond the expiration for acceptance of messages encrypted in the first cryptographic scheme and messages encrypted in the second cryptographic scheme.

The subject matter includes methods for multi-function and multi-purpose cryptography are described, including obtaining, by a cipher engine executing on a computing system, a message and an identifier of a server, the message is to be encrypted by the cipher engine, which is configured to perform at least one of decryption and encryption using a plurality of cryptographic schemes associated with a plurality of servers; determining a cryptographic scheme of the plurality of cryptographic schemes based on the identifier of the server, the cryptographic scheme is associated with the server and defines an encryption scheme; encrypting, by the cipher engine, the message using the encryption scheme to produce a ciphertext; and sending the ciphertext to the server for decryption. During deployment, a multi-function and/or multi-purpose cipher engine may be dynamically changed in the life time of deployment.

The methods may be implemented using one or more computing devices and/or systems. The methods may be stored in one or more computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for multi-function and multi-purpose cryptography.

Figure 1:
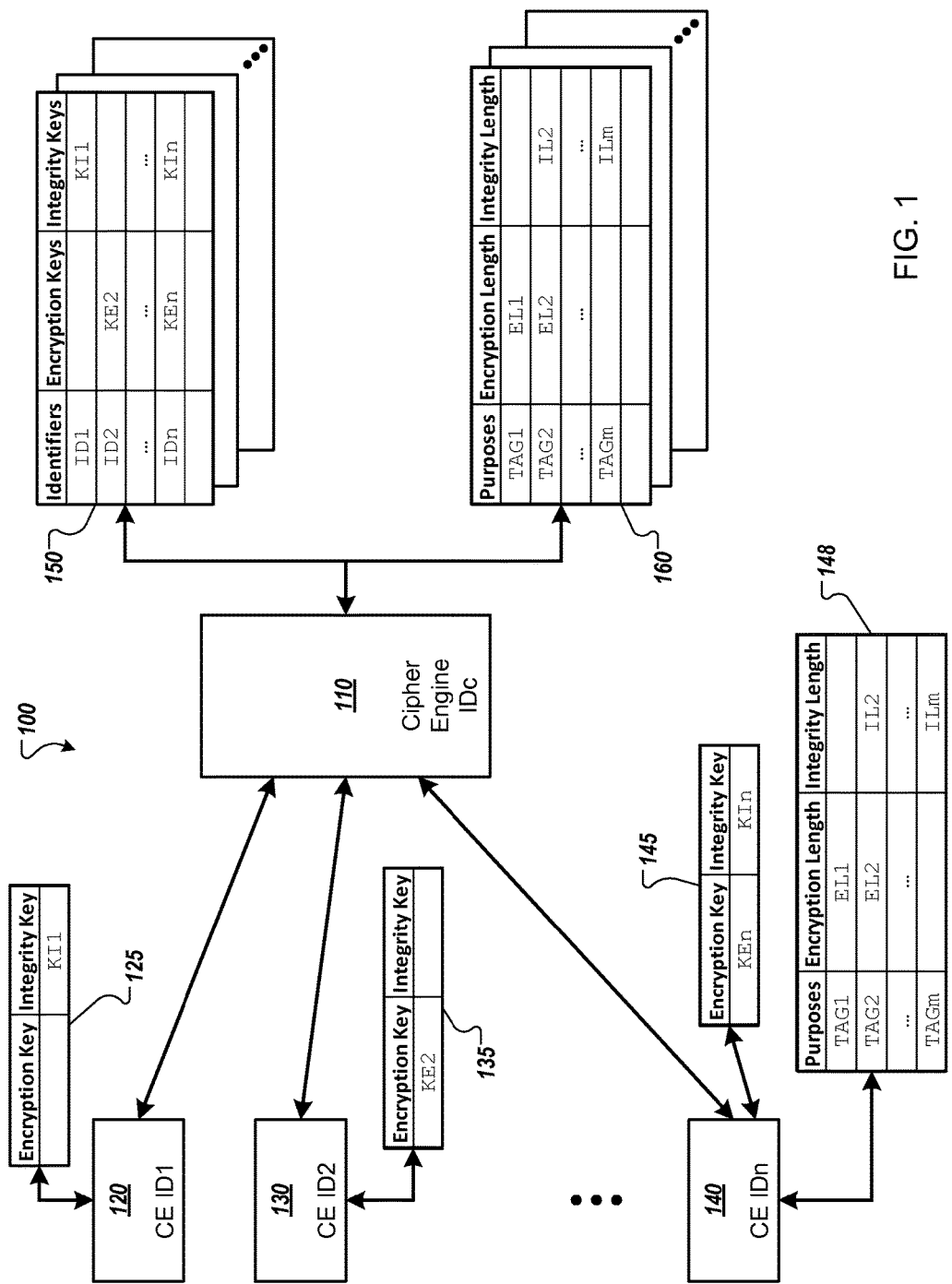
FIG. 1 shows an example cryptographic environment.

FIG. 1 shows an example cryptographic environment. Environment 100 includes, for example, cipher engines (CEs) 110-140. CEs 110-140 provide encryption, decryption, message authentication, integrity communication computation and checking, and related services and operations. CEs 110-140 may be software applications, modules of respective operating systems, devices, etc. executed on respective computing devices and/or systems (not shown). Some or all of the CEs may have associated identifiers, such as IDc, ID1, ID2, IDn. Cipher engine (CE) 110 is shown having access to key information 150 and purpose information 160. CE 120 is shown having access to key information 125. CE 130 is shown having access to key information 135. CE 140 is shown having access to key information 145 and purpose information 148.

Cipher engines 110-140 may be implemented for high-volume and real-time communications (e.g., for supporting encrypted communications on the Internet). Communications between two cipher engines may use any one or more available hash functions, cryptographic functions, encryption functions, one-way functions, and/or pseudorandom functions selected based on performances, levels of security, and/or other factors. Examples of available hash functions, cryptographic functions, and pseudorandom functions include, but are not limited to, Advanced Encryption Standard (AES), Data Encryption Standard (DES), Message Authentication Code (MAC), Keyed-hash Message Authentication Code (HMAC), HMAC-3, Message-Digest Algorithms (MD2, MD4, MD5, MD6), Secure Hash Algorithms (SHA0, SHA1, SHA2, SHA3, . . . , SHA256), HMAC-SHA1, HMAC-SHA256, etc. Other available functions and any customized or modified functions may be used.

A cipher engine, such as CE 110, may communicate with two or more CEs (e.g., CEs 120-140) using different cryptographic schemes. For example, CE 110 communicates with CE 120 using one scheme, communicates with CE 130 using a second scheme, and communicates with CD 140 using a third scheme. A communication scheme may define or specify one or more functions (e.g., hash function, cryptographic function, etc.), one or more keys (e.g., an encryption key and/or an authentication key), other information and customization (e.g., sub-schemes or purposes, etc.). For example, a scheme used between CEs 110 and 140 also defines two or more purposes of communication (e.g., different customization sub-schemes for different plaintexts). Encryption with purposes is described in FIGS. 4A-C below. Also, different messages sent to the same CE may be using different cryptographic schemes.

Key information and purpose information used on both ends of a communication link (e.g., used by CEs 110 and 120, 130, or 140) may be predetermined or prearranged, and may also be dynamically rearranged and/or changed. For example, at the initial set up of a communication link between two partners or parties (e.g., the parties that control, operate, and/or manage CEs 110 and 140), the parties may agree on a communication scheme, such as what cryptographic function and/or authentication function to use, such as HMAC and SHA1, respectively. (For clarity, the examples herein are described using HMAC, SHA1, and HMAC-SHA1 in combination. However, any functions and combination of functions may be used.) One party (e.g., the one that operates CE 110) may provide an encryption key and/or an integrity key to another party (e.g., providing encryption key KEn and an integrity key KIn to the party that operates CE 140). If purposes are used with a cryptographic scheme, purposes information (e.g., 148 and 160) may be established (e.g., provided by one party to another party).

In implementations, a communication scheme may involve only encryption, only authentication, or both. If purposes are used in a communication scheme, the same encryption function or key may be used across different purposes or across a subset of purposes (e.g., other encryption function(s)/key(s) is/are used for other purposes).

Example key information (referred to as key tables for simplicity) may include identifiers information, encryption keys, integrity keys, and/or other information (not shown). Identifiers may be used to identify CEs (e.g., CEs 120-140 have identifiers ID1, ID2, and IDn, respectively). Encryption keys may be the keys (e.g., private or secret keys) shared by and used for encrypting communications between the shared CEs. Integrity keys may be the keys shared by and used for message authentication (e.g., message integrity). Other information (not shown) may include, for example, agreed-upon cryptographic and/or authentication functions, etc.

Key tables 125 and 150 show that integrity key KI1 is used between CE 110 and CE 120, which is associated with an identifier ID1. CE 120 illustrates that the chosen communication scheme does not use a shared encryption key (e.g., a scheme that uses public key encryption or does not use an encryption function at all). Key tables 135 and 150 show that encryption key KE2 is shared and used between CE 110 and CE 130, which is associated with an identifier ID2. CE 130 illustrates that the chosen communication scheme includes a shared encryption key KE2 but does not include a shared integrity key (e.g., a scheme that does not authenticate messages or data in the communication link between CEs 110 and 130). Key tables 145 and 150 show that encryption key KEn and integrity key Kin are shared and used between CE 110 and CE 140, which is associated with an identifier IDn.

CE 140 illustrates that the chosen communication scheme includes customization or enhancement to the chosen cryptographic and/or authentication functions by, for example, defining and using two or more purposes, shown by purpose information 160 and 148. For example, different messages may be encrypted/decrypted using different purpose values to provide data security, data identification, and/or performance enhancement, etc. (e.g., for real-time, high-volume communication over the Internet, etc.).

Example purpose information (referred to as "purpose tables" for simplicity) may include purposes or tags, encryption lengths (ELi), integrity lengths (ILi), and/or other information (not shown). Tags may be used to identify the purposes (e.g., purpose identifiers). Encryption lengths may indicate the lengths of messages, of the corresponding purposes, in plaintext form or ciphertext form (e.g., for use in integrity verification, authentication checking, and/or other uses). Integrity lengths may indicate the lengths of integrity values of the corresponding purposes (e.g., for use in integrity verification, authentication checking, and/or other uses. Other information (not shown) may include, for example, types of messages, formats of messages (e.g., number, text, binary, etc.). Some of the encryption length and integrity length may have values that indicate variable lengths. For example, a negative encryption length value (e.g., "−1") may indicate that the message of the corresponding purpose is of variable length.

Key information 125, 135, 145, and 150 and purpose information 148 and 160 are shown in tables as an example. In implementations, key information and/or purpose information may be stored in a database, one or more files, executing software, and/or anywhere and in any form that is accessible by one or more cipher engines. Key information and purpose information may be organized in any manner. For example key information 150 may be stored in one or more tables. Purpose information 160 may be stored in one or more tables. Key information and purpose information may be stored together (not shown), such as in one or more tables.

In some implementations, communications between two CEs may use more than one scheme (not shown). For example, data associated with purposes 1 to J use one scheme and data associated with purpose J+1 to L use another scheme.

Key information and purpose information may be modifiable live, that is, without requiring stopping the accessing cipher engines. For example, key table(s) 150 and purpose table(s) 160 may be modified (e.g., for adding, deleting, and/or changing the information of one or more rows) while CE 110 and CEs 120-140 continue to execute to provide encryption and decryption services on Internet speed.

Figure 2:
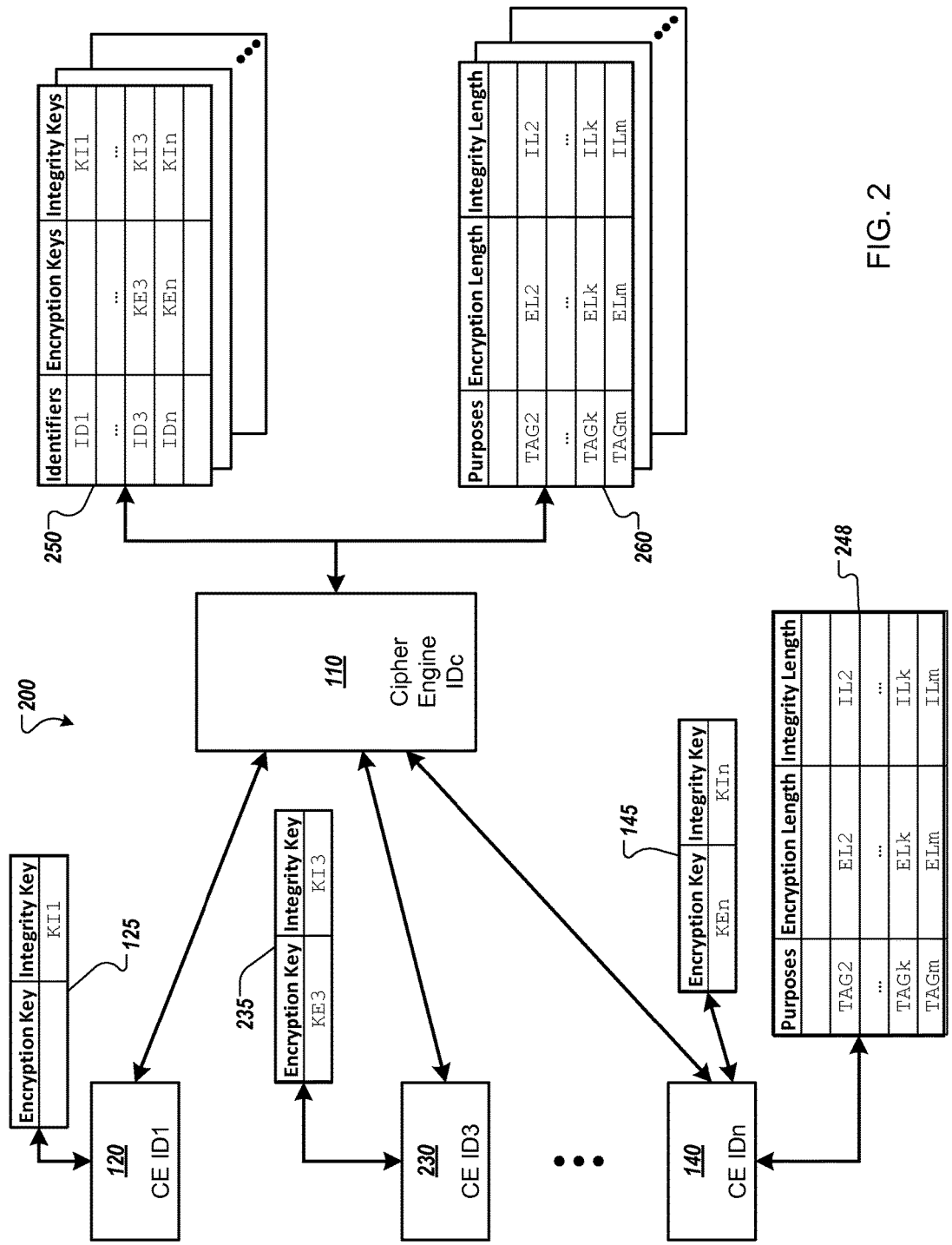
FIG. 2 shows another example cryptographic environment.

FIG. 2 shows another example cryptographic environment. Environment 200 shows a snapshot of environment 100, FIG. 1, after some updates have been performed in connection with CEs 110-140 and 230. The updates may be performed without disrupting or disturbing operations of the CEs (non-stop cipher engines). A non-stop cipher engine provides secure and viable cryptographic schemes by, for example, allowing one or more keys and/or information associated with the cryptographic schemes to be refreshed or updated (e.g., deleted, added, and/or modified) to provide services and adapt to the changing computing needs.

Updates may be performed to the key information (e.g., key table 250), purpose information (e.g., purpose table 260), and/or some portion of the CE software (e.g., a dynamically accessed library, header file, configuration file, etc. with the updated or part of the updated information).

The examples in FIG. 2 show updates to the key information and purpose information. Key table 250 is the same key table 150, FIG. 1, updated with the ID2 row (and KE2) removed and ID3 row added. Purpose table 260 is the same purpose table 160, FIG. 1, updated with the TAG1 row (and EL1) removed, TAGk row added, and TAGm row modified (added EIm). The same updates may be reflected on the other side of CD 110's communications links (e.g., CEs 230 and 140). For example, CE 230, newly added, is shown having access to key table 235 with KE3 and KI3 corresponding to the same information on the ID3 row of table 250.

For example, to add a cryptographic scheme between CE 110 and a new communication partner (e.g., cipher engine 230) or an existing communication partner (e.g., cipher engine 120 or 140), information for the cryptographic scheme may be entered to data stores or tables accessed by the partner CEs without interrupting their operations. The information may be entered manually or with the assistance of a software mechanism (e.g., user interface). In some implementations, the software mechanism may be associated with a key exchange protocol, such as Secure Sockets Layer (SSL) protocol, the Transport Layer Security (TLS) protocol, the like, or a customized or newly developed protocol.

To enable updating information manually, for example, cipher engines may be implemented to read in updated key information and purpose information (incremental or complete information) on predetermined times and/or intervals (e.g., every X number of minutes, such as 30, every Y number of hours, such as two, every day at 03:00 hour, etc.). Information added before the next read by a CE will be available to the CE after the next read. Information can be deleted after a CE's last read of the information (i.e., the deleted information is determined not needed after the last read). And information can be changed (e.g., the equivalent of the combination of a deletion before an addition) after the information to be deleted is no longer needed and before the information to be added is needed.

For example, operators of CEs 110 and 140 shared some update key and/or purpose information (e.g., addition, deletion, and/or modification reflected on tables 260 and 248) and agreed upon a schedule (e.g., at 21:00 hour on a certain day) to perform the updates. CE 110 may be implemented to update itself with key and purpose information by fetching or reading tables 250 and 260 at 09:00 hour and 21:00 hour. CE 140 may be implemented to update itself every three hours (e.g., at 03:00*I hours, I=0 to 8). Based on the agreed-upon update schedule, the operator at CE 110 may enter update information to tables 250 and 260 any time after the last read at 09:00 on that day. The operator at CE 140 may enter update information to tables 145 and 248 any time after the last read at 18:00 on that day. At 21:00 hour of that day, updated information (e.g., addition, deletion, and/or modification) are read by CEs 110 and 140 without stopping or any interruption of service.

To implement updating using an assisted mechanism (e.g., user interface or UI, not shown), the UI may take input from an operator (e.g., operator of CE 110 or 140) and perform the update based on the implementation of a CE and a schedule by the operator. For example, CE 110 is implemented as described above (e.g., to update itself at 09:00 hour and 21:00 hour). The operator may, at any time, provide information to be updated and schedule the mechanism to update tables 250 and 260 at 08:59 at the agreed-upon day. The operator itself, in turn may be updated by a secure communication protocol (e.g., using SSL/TLS, etc.).

In some implementations, updating on both ends of a communication link does not need to be synchronized (e.g., CE 110 is updated but CE 140 is not). For example, key and/or purpose information may be associated with a version number. Encrypted information may be communicated from one CE to another CE with the information version number, at least in the first packet of information. CE 110 may encrypt and/or authenticate a message using version 5 of the key and/or purpose information. CE 110 sends the ciphertext with an indication that version 5 information is used. CE 140, on the receiving end, checks to see if version 5 information is available. If it is, CE 140 decrypts and/or checks the authentication of the received information. If version 5 information is not available (assuming that it will be after a subsequent update of information), CE 140 may queue or stored the received message to be processed later when version 5 information is available.

Figure 3:
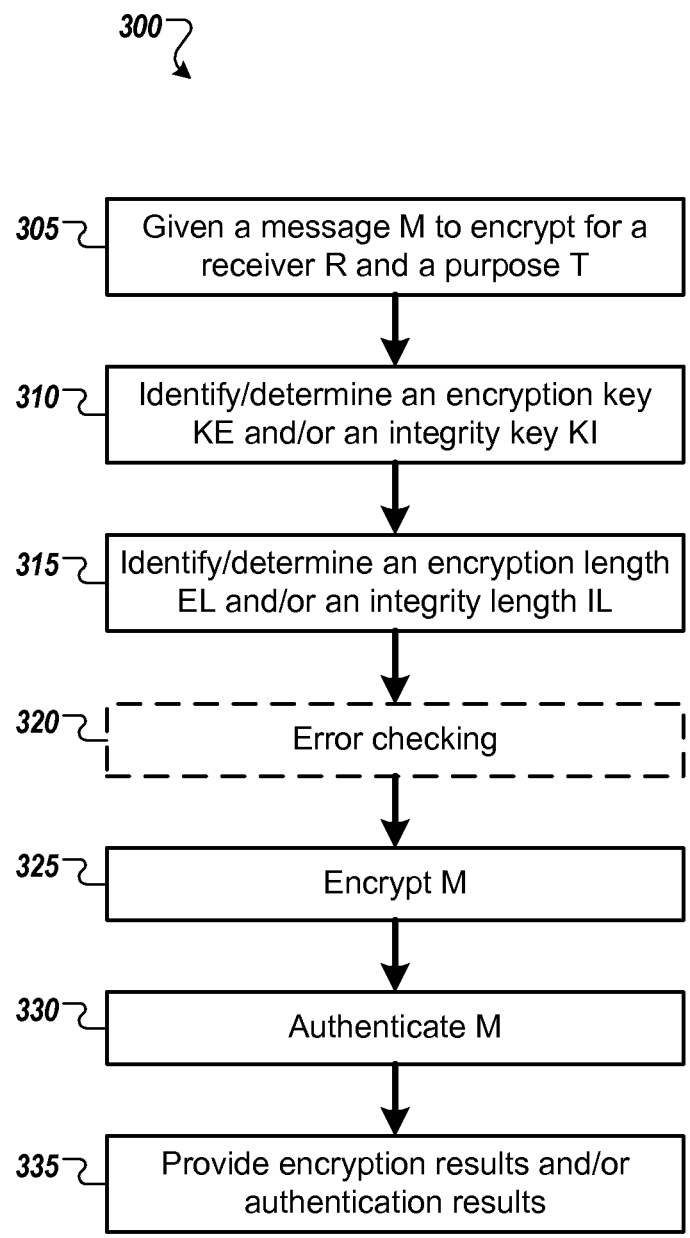
FIG. 3 shows an example of a data preparation process.

FIG. 3 shows an example of a data preparation process. Process 300 is described with references to FIG. 2. At some point before communicating an encrypted message (i.e., sending a ciphertext) to a receiver (e.g., CE 140), a message M or plaintext is given, received, retrieved, or otherwise obtained by a sender (e.g., CE 110) at block 305. Based on the message (e.g., the length of the message and/or the content of the message, such as a currency value) and/or the receiver (e.g., CE 140 with the identifier IDn) a purpose may be determined or identified (e.g., using table 160 or 260). In some implementations, a purpose associated with the message is given or pre-identified. The purpose is a TAG2 purpose, for example.

At block 310, key information associated with the communication partner is identified, determined, or looked up (e.g., KEn and KIn for IDn or CE 140). At block 315, based on the purpose (e.g., TAG2), the purpose information, which provides length information, such as encryption length EL2 and integrity length IL2, is retrieved. Optionally, at block 320, some error checking may be performed. For example, the length of the message may be verified or compared to the EL2 value. Error messages and/or other appropriate operations may be performed if the length of the message is not verified. It the length is verified, at block 320, the existence of an encryption key KEn indicates that the message should be encrypted using the predetermined function (e.g., HMAC-SHA1 used as a pseudorandom function, stored in a column of table 250, not shown). In some example implementations, an encryption function (e.g., MAC-SHA1 or HMAC-SHA1) may be used by default unless a different function is specified or defined (e.g., in table 250, not shown). The message M is encrypted at block 325 to produce a ciphertext. Example encryption operations are described in FIGS. 4A-C below.

At block 330, the existence of an integrity key KIn indicates that the message should be authenticated using the predetermined function (e.g., HMAC or HMAC-SHA1, stored in a column of table 250, not shown). In some implementations, a hash function (e.g., one based on a MAC function, e.g., HMAC-SHA1) may be used by default unless a different function is specified or defined (e.g., in table 250, not shown). At block 330, the message is authenticated to produce an integrity value. There are many ways to produce the integrity value, which is used by the receiver to authenticate the ciphertext. For example, given a function F (e.g., HMAC or HMAC-SHA1) and an integrity key (e.g., KIn), the integrity value may be produced from:

integrity value=F (KIn, message)
integrity value=F (KIn, ciphertext)
integrity value=F (KIn, IV||message)
integrity value=F (KIn, IV||ciphertext)
integrity value=any combination of the above F operations IV is a random value associated with the current invocation of the cipher, pseudorandom value, or any agreed upon unique private or public value. IV examples are described in FIGS. 4A-B. || denotes concatenation. The integrity value may be truncated down to or extracted only a few bytes of data (e.g., any agreed-upon four bytes) and indicated by the integrity length value (e.g., IL2, ILk, or ILm) in table 260, FIG. 2. The receiver (e.g., CE 140) knowing the same F, the same secret integrity key KIn, and the same way of producing another integrity value from the ciphertext is able to authenticate or validate the integrity of the ciphertext by checking the equality of the produced value against the received value. The receiver's operations are described further in FIG. 5 below.

At block 335, the encryption results and/or authentication results are sent to the receiver. For example, the ciphertext if encryption is performed, the integrity value if authentication is performed, the IV value (described in FIG. 4) if used, and the receiver identifier (e.g., IDn) are sent to the receiver. The receiver and the sender may be referred to as cipher engines, partners, or servers.

In some examples, process 300 may be implemented with different, fewer, or more blocks. Process 300 may be implemented as computer executable instructions, which can be stored on a medium, loaded onto one or more processors of one or more computing devices, and executed as a computer-implemented method.

Figure 4A:
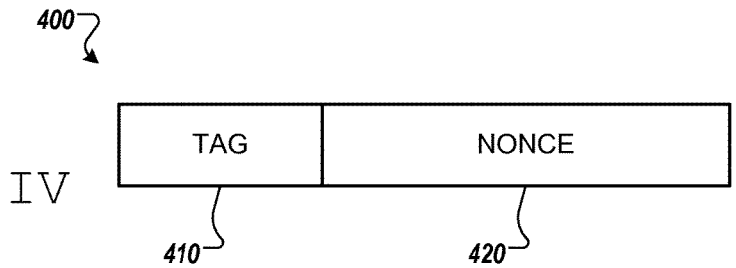
FIG. 4A shows an example data string used in a cryptographic scheme.

FIG. 4A shows an example data string used in a cryptographic scheme.

Data string 400 may be referred to as an initial vector or IV 400. IV 400 includes a tag 410 and a nonce (e.g., a number that is arbitrary, and with high probability only used once in a cryptographic communication) 420. Tag 410 is used in a communication scheme that involves different purposes for different messages. Tag 410 is not used or used with a default value if a communication scheme does not use purposes. Nonce 420 may be any value or string that is not easily repeatable in the system. An example of a nonce 420 may be the combination or concatenation of a timestamp, an identifier or internet protocol (IP) address of the sender, and other value (e.g., tie-breaker value) that ensures two IVs created in a small time window by the same sender are not the same. An example tie-breaker value may be an identifier (e.g., PID) of an executing process spawned to form the IV, or a few least-significant bytes of a PID.

For example, tag 410 may be a one-byte value (i.e., supports 256 tags), and the nonce 420 may be a 15-byte value (e.g., an eight-byte timestamp, a 4-byte sender or server IP address or identifier, and a 3-byte PID). In combination, IV 400 is a 16-byte value that is different from another 16-byte IV created at another time and/or by another process (e.g., with a different PID). Components of IV 410 may be arranged in any manner or order.

IV 400 provides added benefits of detecting stale responses, replies, and/or attacks. Since an IV includes a timestamp of the time of the start encryption, any IV value received substantially later or unreasonably later than the timestamp is a suspect data package and may be subject to further determination or investigation.

Figure 4B:
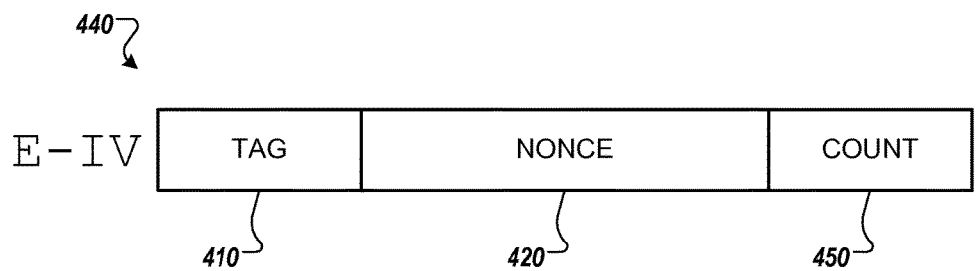
FIG. 4B shows another example data string used in a cryptographic scheme.

FIG. 4B shows another example data string used in a cryptographic scheme.

Data string 440 may be referred to as an extended IV or E-IV 440. E-IV 440 is IV 400 with a count 450. Count 450 may be one or more bytes long, depending on implementations and/or message length. For example, to implement an expandable count 450, count 450 may start as a one-byte value for any count value from 0 to 255. After that, count 450 may be two bytes long for the next 256 counts (e.g., the first byte stores a "0" or another value plus a second byte stores the count). Then count 450 may be three bytes long (e.g., first two bytes store "00"+a count byte) for the next 256 counts, and so on. The count value may be expanded to support unlimited number of counter bytes to encrypt a message of arbitrary length.

In some implementations, where more than 256 tags are needed, Tag 410 may be implemented to be expandable in the same fashion as count 450.

IV 400 and E-IV 440, used as seed values in cryptographic functions, are generated in a manner or any manner that results in a value that is not easily repeatable in the system. For example, the PID in nonce 420 is pseudo random and count 450 is generated in a manner only shared by the CEs on both ends of a communication link (e.g., different pair of CEs may implement count 450 differently). IV may be exchanged in the clear between the sender and the receiver or may be exchanged in a secure manner (e.g., using SSL/TLS, etc.).

Figure 4C:
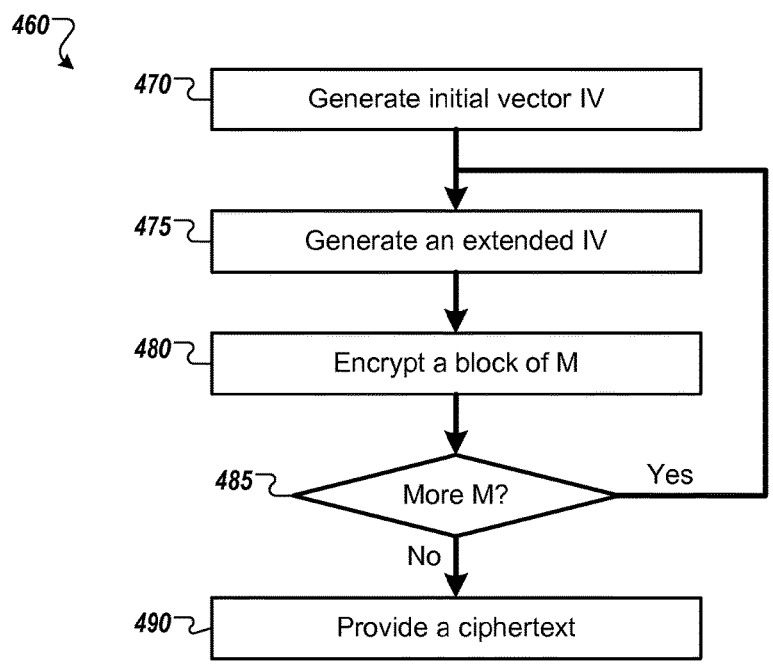
FIG. 4C shows an example of an encryption process.

FIG. 4C shows an example of an encryption process. Process 460 describes an example encryption process implementation for encrypting a message M as shown in block 325, FIG. 3. At block 470, an IV is generated as described in FIG. 4A. The communication scheme uses the HMAC-SHA1 function, for example, which outputs a 20-byte chunk of random-looking string to be used for cipher data (may be referred to as a cipher pad). To encrypt a message M of length L, the number of chunks of cipher data need to be produced so that the sum of chuck lengths is greater than or equal to L. Assuming that the message M is associated with purpose TAG2 (FIG. 2, 260) and is eight-byte long (e.g., EL2=8). At block 475, a first E-IV is generated IV only, and no counter. The E-IV may be generated as described in FIG. 4A, for example. At block 480, a block of M is encrypted. First, if M is longer than 20 bytes, it is broken up into different segments, each is 20-bytes in length except the last segment. Here, M is 8-byte long, so no need to break it up. Then a chunk of cipher data is produced using F (KEn, E-IV), which is the same as F (KEn, "TAG2||current timestamp||server ID||current PID"). Since the chunk is 20 bytes long, it is truncated to the first eight bytes, the length of M. Then the ciphertext C is produced by performing a bitwise exclusive OR between M and the 8-byte chunk (i.e., C=M XOR chunk). Alternatively, as another example for starting the first chunk of the cipher pad, the first E-IV used for the first chunk can be generated as in FIG. 4B with count=0.

At block 485, check to see if there is another block of M that has not been encrypted. If so, repeat the operations from block 475 on. In this example, where M is eight byte long, there is no more remaining M to encrypt. The ciphertext C is provided at block 490.

If M is longer than 20 bytes, process 460 is iterated over blocks 475-485 more than once. For example, given a different M that is 44 bytes (352 bits) long. M is associated with the purpose TAGk, for example. M is broken up into two 20-byte segments and a third 4-byte segment. At block 470, IV is generated as "TAGk∥current timestamp∥server ID∥current PID". At block 475, the first E-IV (or E-IV$_1$) is generated as "IV∥count=0". AT block 480, to encrypt the first segment (segment$_1$) of M, a first chunk (chunk$_1$) of cipher data is produced by chunk$_1$=F (KEn, E-IV$_1$). The first 20-byte of ciphertext (C$_1$)=segment$_1$ XOR chunk$_1$. More M is yes at block 485. Process 460 iterates through blocks 475-485 two more times to produce:

C$_2$=segment$_2$ XOR chunk$_2$; chunk$_2$=F (KEn, E-IV$_2$); E-IV$_2$="IV∥count=1"; and C$_3$=segment$_3$ XOR chunk$_3$; chunk$_3$=F (KEn, E-IV$_3$); E-IV$_3$="IV∥count=2".

Since segment$_3$ is 4-byte long, chunk$_3$ is truncated down to four bytes, and C$_3$ is 4-byte long. At block 490, a 44-byte ciphertext C=C$_1$∥C$_2$∥C$_3$ is provided.

Having unique IV values are vital. For example, if messages M1 and M2 are encrypted using the same IV value. Ciphertext C1=F (KEn, IV) XOR M1; and C2=F (KEn, IV) XOR M2. If an attacker or data interceptor intercepts C1 and C2, which may be communicated over the Internet, the attacker will be able to recover Ml if the attacker is aware of M2, and vice versa since M1=C1 XOR C2 XOR M2. For each unique IV value, E-IV$_1$, E-IV$_2$, E-IV$_3$, . . . E-IV$_n$ are generated to ensure unique initialization vectors for each of the segment of the message M.

Note that C may also be produced by C=M XOR "chunk$_1$∥chunk$_2$∥chunk$_3$" ("chunk'∥chunk$_2$∥chunk$_3$" may be referred to as a cipher pad).

In some example implementations, process 460 may be implemented with different, fewer, or more blocks. Process 460 may be implemented as computer executable instructions, which can be stored on a medium, loaded onto one or more processors of one or more computing devices, and executed as a computer-implemented method.

Figure 5:
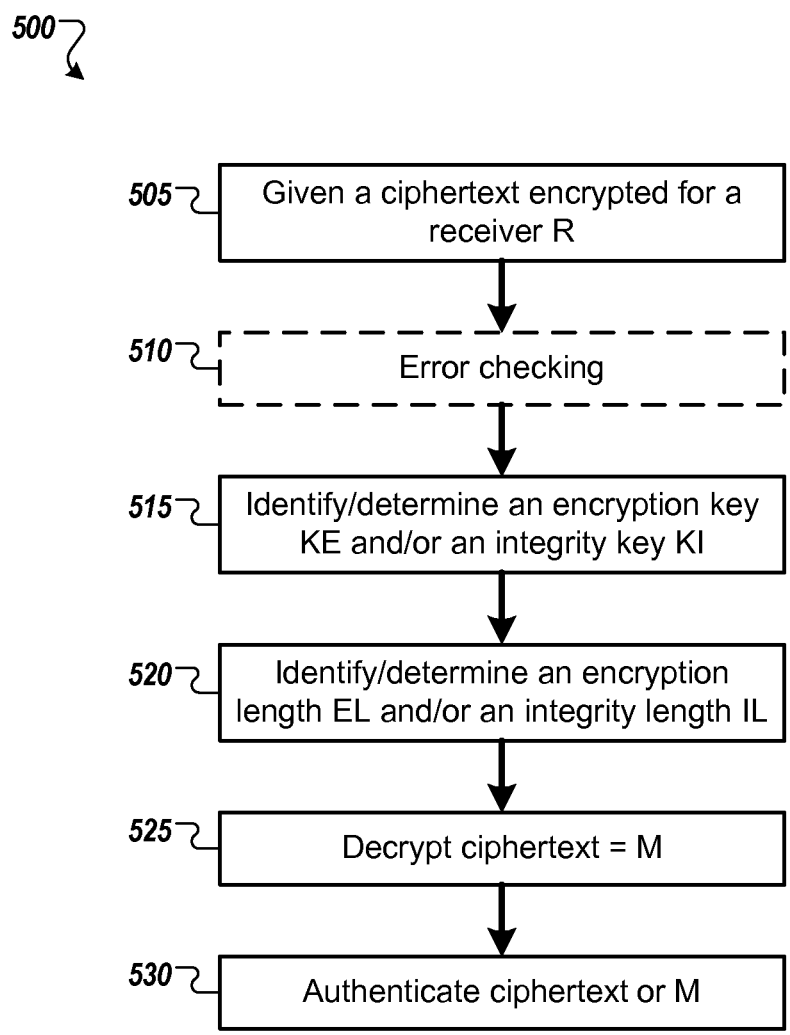
FIG. 5 shows an example of another data preparation process.

FIG. 5 shows an example of another data preparation process. Process 500 is described with references to FIG. 2. At block 505, a receiving CE (e.g., CE 140) receives encrypted data from a sender (e.g., CE 110). The received data may include a ciphertext if the communication scheme includes encryption, an integrity value if authentication is included, an IV value if used, and the receiver identifier (e.g., IDn). Optionally, at block 510, some error checking may be performed. For example, the receiver identifier is verified as that of the receiving CE. In some implementations, the sender is also verified using the sender's server ID or IP address (e.g., extracted from the received IV). Error messages and/or other appropriate operations may be performed if any verification or checking fails.

If nothing fails, process 500 continues to block 515 where key information associated with the communication partner is identified, determined, or looked up (e.g., KEn and KIn from table 145). In some implementations, CE 140 may communicate with two or more partners, and table 145 may include identifiers of the communication partners (e.g., IDc for CE 110, not shown). At block 520, a tag value for a communication is extracted from the received IV value. Based on the extracted purpose (e.g., TAG2), the purpose information, which provides length information, such as encryption length EL2 and integrity length IL2, is retrieved from table 248. The received integrity value may be checked against the integrity length IL2. If the length is checked out, at block 525, the received ciphertext is decrypted. Example decryption operations are described in FIG. 6 below. A message M is produced from the decryption operations.

At block 530, if an integrity value is received, it is used to perform an authentication verification or checking. To detect any tampering during transmission, another integrity value (integrity value 2) is generated by the receiver CE [in exactly the same method an integrity value that was received was generated by the sender (at 330 above). The integrity value 2 may be generated the same way the received integrity value was generated since the sender and receiver (e.g., CEs 110 and 140) share information about the function used F, the same secret integrity key KIn, the same secret integrity length value IL2, and the same way of producing the integrity value (e.g., using the message M and the IV used). After integrity value 2 is generated, it is compared with the received integrity value to authenticate or validate the integrity of the received ciphertext. If integrity value 2 matches integrity value, the received ciphertext is validated and the decrypted message M is accepted. If not, an error has occurred and appropriate operations may be performed. Note that generating the integrity tag at block 330, FIG. 3, and at block 530 using M can be done in various other ways, e.g., replacing M by C, as long as the sender and receiver are in agreement on what integrity method is to be employed.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6:
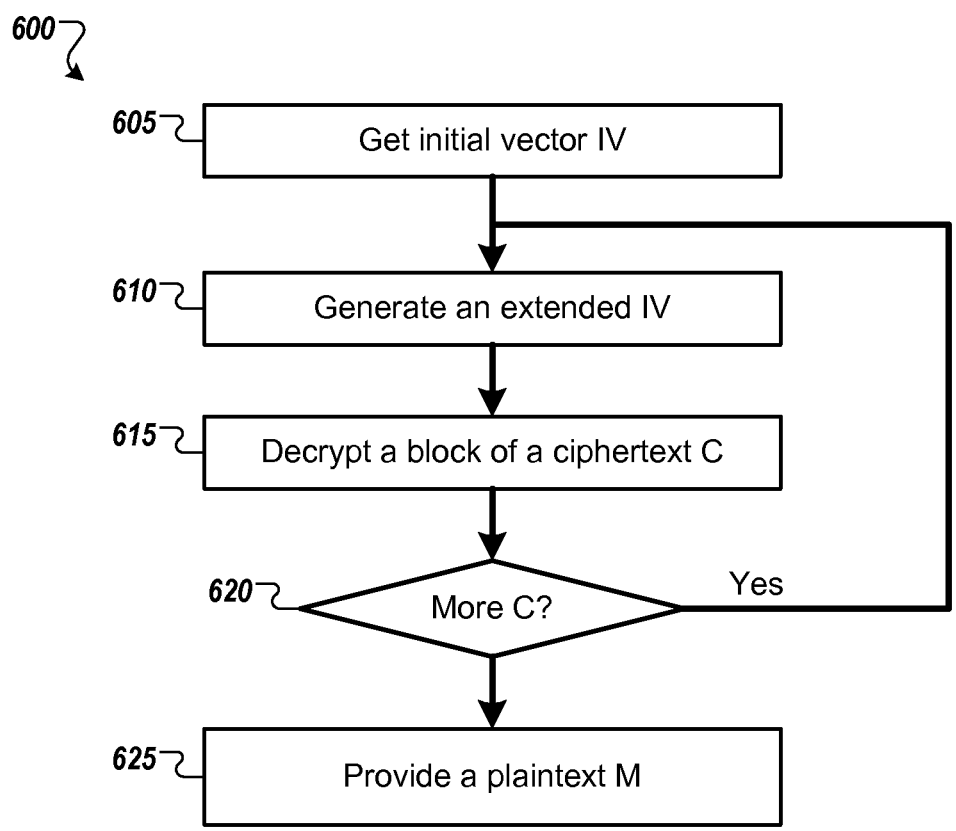
FIG. 6 shows an example of a decryption process.

FIG. 6 shows an example of a decryption process. Process 600 describes an example decryption process implementation for decrypting a ciphertext C as shown in block 525, FIG. 5. At block 605, the received IV is identified and extracted. Take, for example, that the received C is the one generated in FIG. 4C from the 44-byte M. Knowing how IV is generated (e.g., when the IV will be sent on the clear), the receiver (e.g., CE 140) can extract or retrieve the tag value (e.g., TAGk) associated with the purpose of communicating the message to be decrypted.

Decrypting C uses the special characteristics (A XOR B XOR A=B) of the XOR operation. Since C=cipher pad XOR M. M=cipher pad XOR C=cipher pad XOR cipher pad XOR M. Therefore, the same cipher pad used in producing C needs to be generated here to decrypt C to produce M. Since CEs on both ends of a communication links share the same secret keys, same cryptographic function(s), and the same manner in producing count values, both CEs, given the IV, can produce the exact cipher pad, in segments or in whole.

C is a 44-byte string and is broken up into two 20-byte segments (C$_1$ and C$_2$) and a third 4-byte segment (C$_3$). At block 610, the first E-IV (or E-IV$_1$) is generated as "IV∥count=0". AT block 615, to decrypt the first segment of C (C$_1$), a first chunk (chunk$_1$) of cipher data is produced by chunk$_1$=F (KEn, E-IV$_1$). The first 20-byte of M (M$_1$)=C$_1$ XOR chunk$_1$. More C predicate question result in a yes at block 620. Process 600 iterates through blocks 610-620 two more times to produce:

M$_2$=C$_2$ XOR chunk$_2$; chunk$_2$=F (KEn, E-IV$_2$); E-IV$_2$="IV∥count=1"; and M$_3$=C$_3$ XOR chunk$_3$; chunk$_3$=F (KEn, E-IV$_3$); E-IV$_3$="IV∥count=2".

Since C$_3$ is 4-byte long, chunk$_3$ is truncated down to four bytes, and M$_3$ is 4-byte long. At block 625, a 44-byte message M=M$_1$∥M$_2$∥M$_3$ is provided.

In some examples, process 460 may be implemented with different, fewer, or more blocks. Process 460 may be implemented as computer executable instructions, which can be stored on a medium, loaded onto one or more processors of one or more computing devices, and executed as a computer-implemented method.

In some examples, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
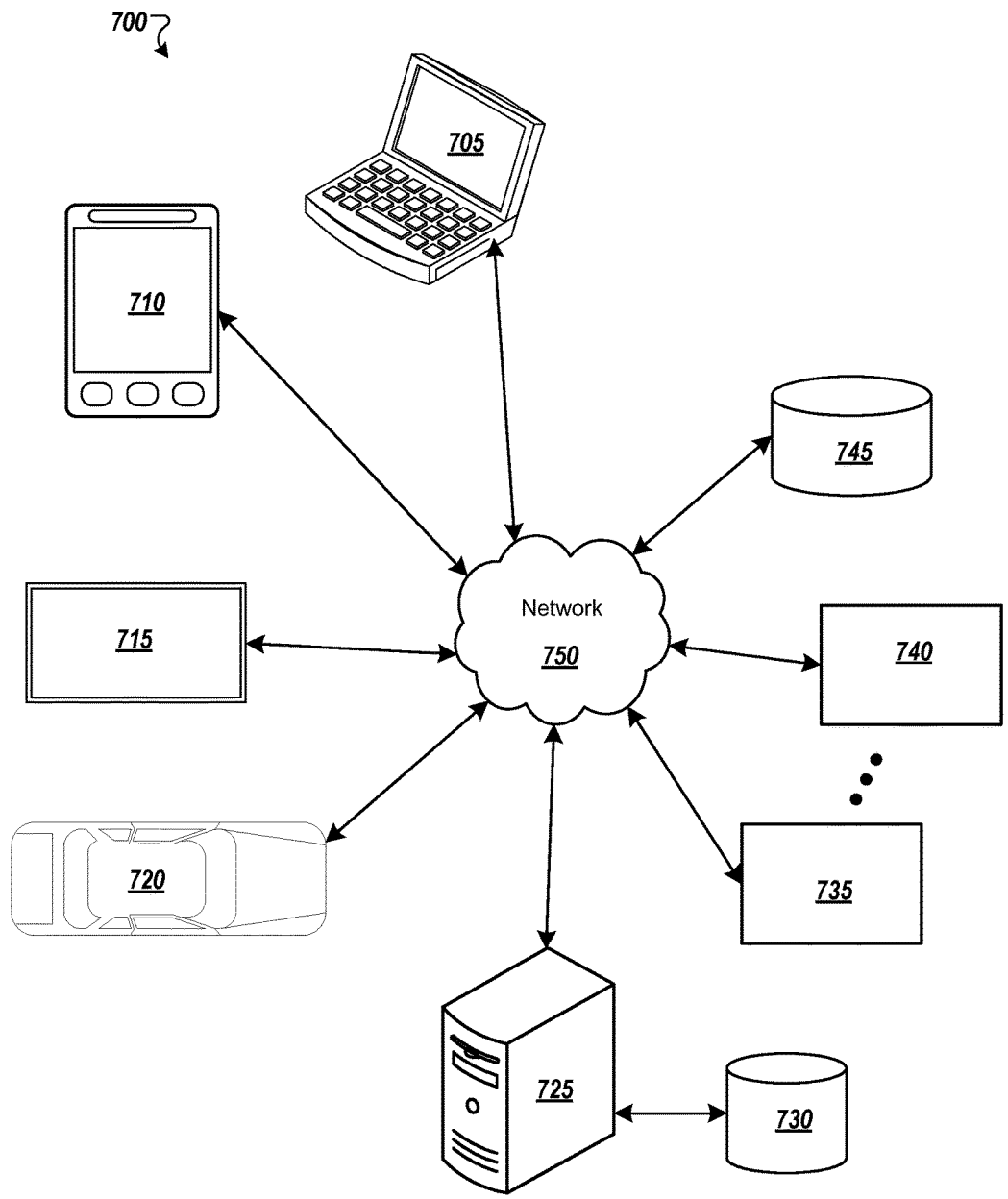
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing device 805 described below in FIG. 8. Devices 705-745 may include, but are not limited to, a computer 705 (e.g., a laptop computing device), a mobile device 710 (e.g., smartphone or tablet), a television 715, a device associated with a vehicle 720, a server computer 725, computing devices 735-740, storage devices 730 and 745.

In some implementations, devices 705-720 may host CEs 120-140 (FIG. 1) and 230 (FIG. 2) that communicate with CE 110 (FIGS. 1 and 2) hosted by device 725, for example.

Figure 8:
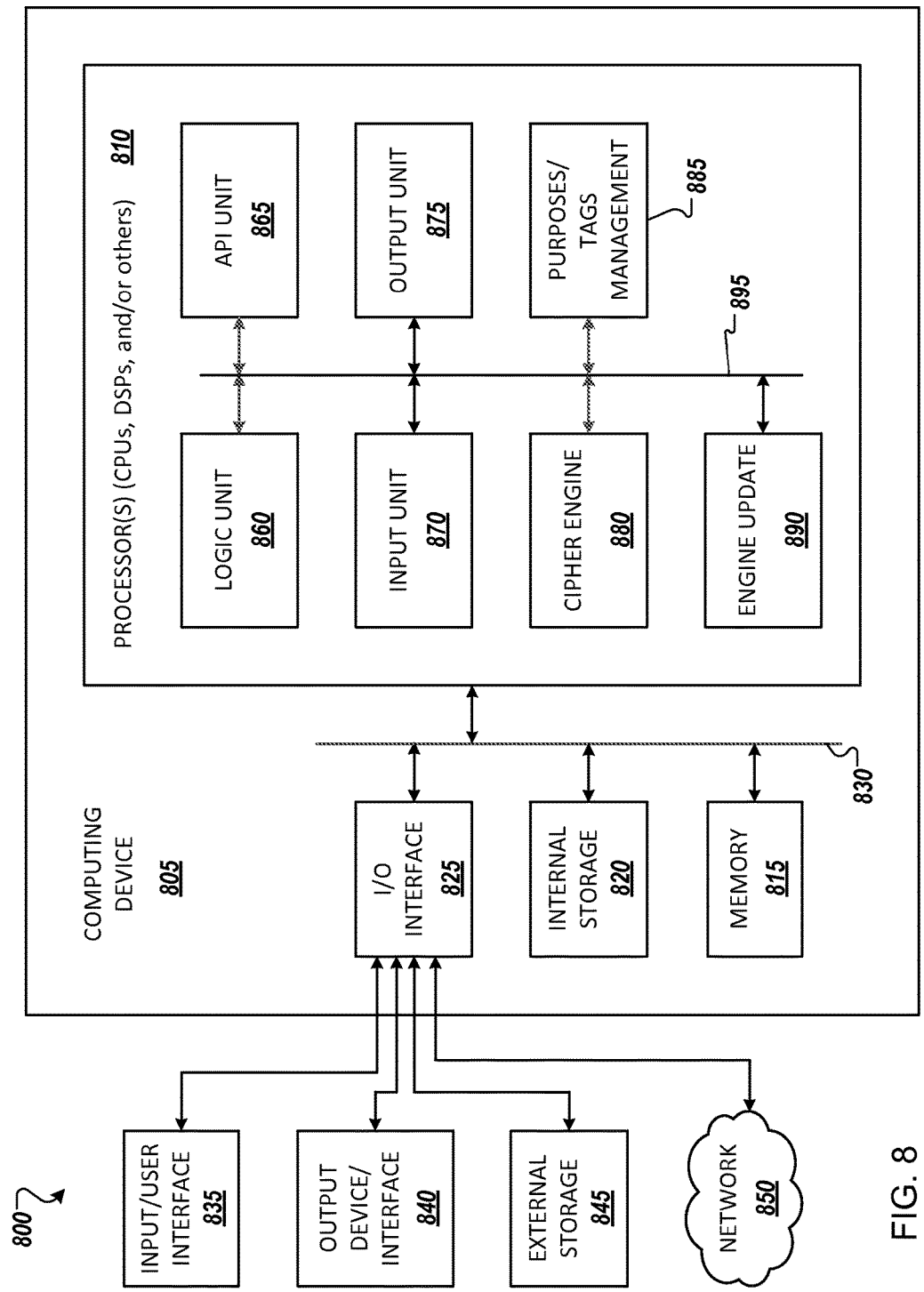
FIG. 8 shows an example computing environment with an example computing device suitable for use in some example implementations.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, cipher engine 880, purposes/tags management 885, engine update 890, and inter-unit communication mechanism 895 for the different units to communicate with each other, with the OS, and with other applications (not shown). For example, cipher engine 880, purposes/tags management 885, and engine update 890 may implement one or more processes shown in FIGS. 1-3 and 4C-6. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, cipher engine 880, purposes/tags management 885, and engine update 890). For example, cipher engine 880 may be used to implement anyone of CE 110-140, or 240. A communication scheme that involves purposes and tags is supported by purposes/tags management 885, which, for example, associates a message with a tag and determines an associated tag for a given message. When cipher engine 880 needs to be updated (e.g., the key information and/or purpose information accessed by the cipher engine 880), engine update module 890 may be used. For example, engine update 890 may take a user's or an administrator's updated information and store it in memory 815 and/or internal storage 820. When the time comes to perform the update (e.g., a scheduled time), engine update 890 updates one or more tables used by cipher engine 880.

In some instances, logic unit 860 may be configured to control the information flow among the units and direct the services provided by API unit 865, input unit 870, output unit 875, cipher engine 880, purposes/tags management 885, and engine update 890 in some example implementations described above. For example, the flow of one or more processes or implementations may be controlled by logic unit 860 alone or in conjunction with API unit 865.

Figure 9:
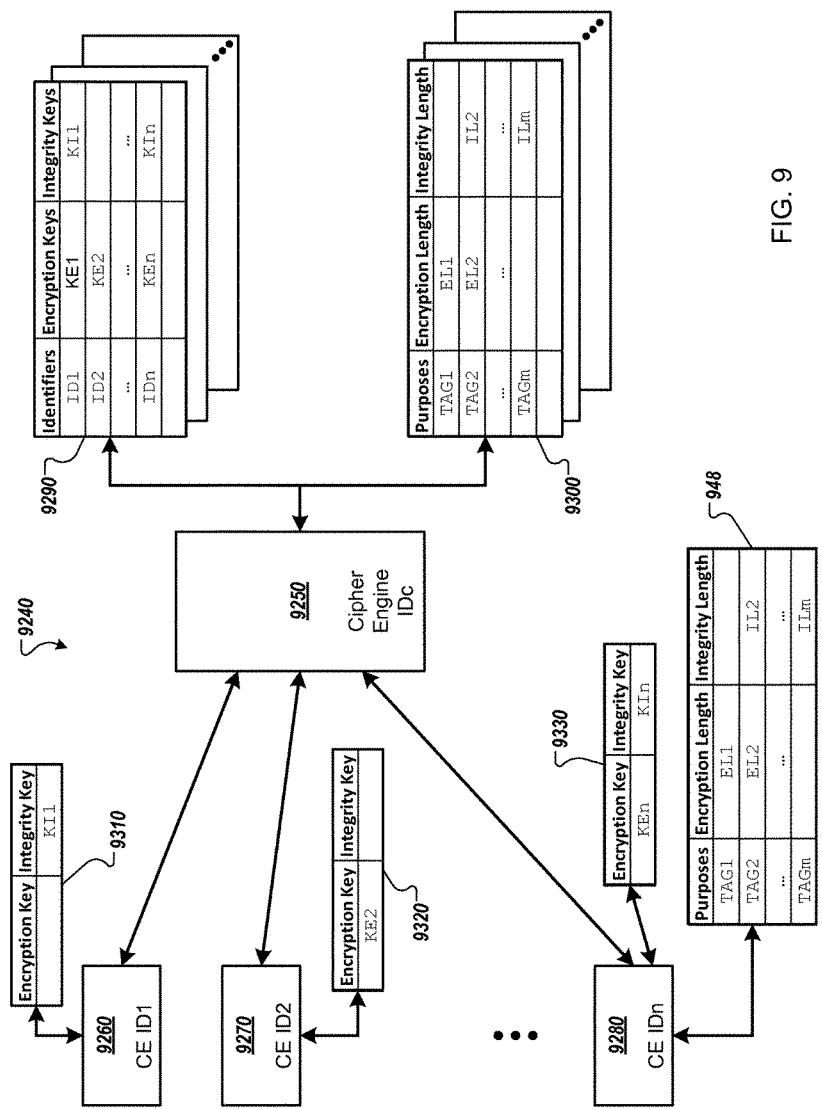
FIGS. 9 and 10 illustrate an example cryptographic environment and process, respectively, according to another example implementation.
Figure 10:
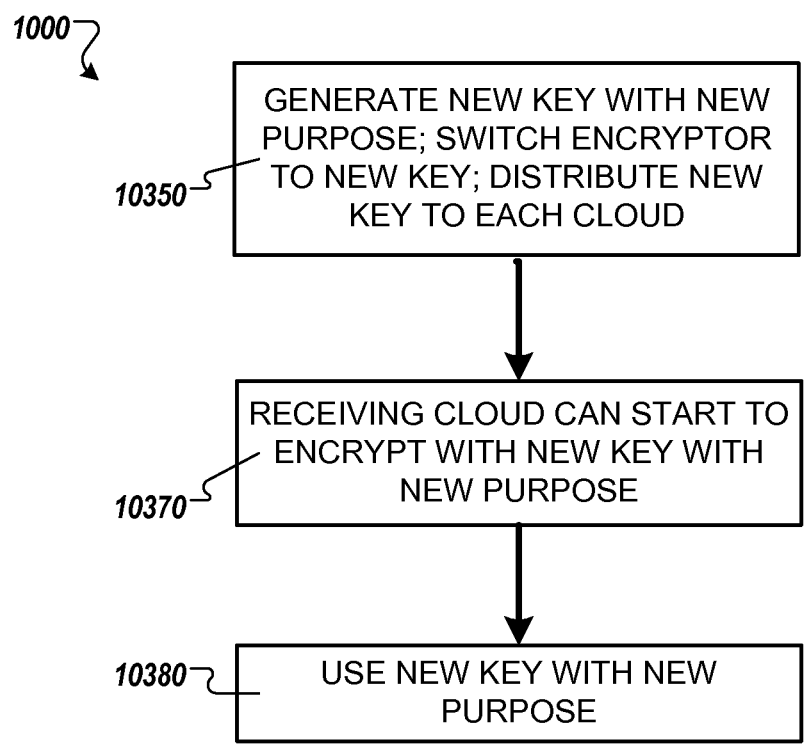

FIGS. 9 and 10 illustrate an example environment and process, respectively, according to another example implementation.

For the example environment 9130 of FIG. 9, a provider cloud and an agency cloud 903 have agreed upon a new key to distribute within the cloud. It is noted that the features illustrated in FIGS. 1 and 2 are used in the same manner as disclosed above, as well as in the manner described below. For example, in this example implementation, the cipher engines 9140-9170 provide the above-described functions, and have substantially the same key information (e.g., 9200, 9210, 9220) and purpose information (e.g., 948, 9180, 9190). For example, the key table 9180 associates each identifier, encryption key and integrity key for a cipher engine 9140, and the purpose table 9190 associates a purpose with an encryption length and an identity length. As explained above, the information of the key table 9180 and the purpose table 9190 may be combined in a single consolidated table.

This example implementation provides for the transition to the new encryption key (e.g., from KE1 to KE2), without stopping ongoing operation (e.g., without disturbing or disrupting the operations of the cipher engines (e.g., CE IDc 9250).

As a process to accomplish the transition, and as shown in the process 1000 of FIG. 10, two purpose tags are generated, and are dedicated to the same purpose. In a first phase 10350, the new key (e.g., KE2) is generated, and is operated with an encryptor. A timestamp (e.g., timestamp1) is applied. The encryptor switches to the new key (e.g., KE2), which is distributed to each cloud. When the new key (e.g., KE2) is distributed to each cloud, the new purpose (e.g., TAG2) is provided to each cloud. Accordingly, the receiving cloud may start to encrypt using the new key indicated with the new purpose, as noted in 10370. In a second phase 10380, the new key (e.g., KE2) is used with the new purpose (e.g., TAG2).

By way of example, at a first time (e.g., 11:50 AM), the first phase is performed, and the new key (e.g., KE2) is exchanged and propagated; it is noted that the prior key (e.g., KE1) has a first tag (e.g., TAG1). The first time is determined based on agreement between the entities (e.g., a first cloud and a second cloud, wherein one of the entities initiates the transition from an old key to a new key), or by scheduling at a prescribed or predetermined time (e.g., regular interval, where the parties need not agree on the timing). At a second time (e.g., 12:01 PM), the second phase is performed, and the encryption is performed thereon with the tag (e.g., TAG2) of phase 2. During the time window when both keys are valid, the receiver can know which key to use, and if the new has not yet been distributed, the ciphertext can be delayed, such that it is decrypted after the new key arrives. Accordingly, asynchronous key change can be performed between two cloud entities (e.g., very large cloud entities) without disturbing service.

Each of the entities announces the new period in the respective cloud (e.g., so that all computers within that cloud know that a new period is starting at a prescribed time). Accordingly, each of the clouds internally propagates the new key. As a result, there is a time window that includes time prior to the start of the new period (e.g., phase 1, wherein the key has been determined in advance), as well as time after the start of the new period (e.g., phase 2), such that both of the tags (e.g., TAG1 and TAG2) are valid during the entire time window.

It may not be known whether all of the machines have been synchronized to the new key (e.g., whether and when all of the machines are using KE2 instead of KE1), and have actually moved from the previous purpose (e.g., TAG1) to the new purpose (e.g., TAG2) in concert. Thus, at the time of the sending in the first phase, the envelope indicates the old key (e.g., KE1 at 11:59 AM), followed by a switch to the new key (e.g., KE2 at 12:00 PM), and the receiver receiving the message thereafter (e.g., at 12:01 PM). However, the receiver can encrypt based on the tag (e.g., TAG2) that flowed with the earlier message sent in the first phase, using the new key (e.g., KE2).

If there is a delay in obtaining the message, the receiver may optionally keep the old key (e.g., KE1), even after the new key (e.g., KE2) has been provided. Further, according to example implementations, it may be possible to recover the old key (e.g., KE1), until the software is updated at the next phase change. In such example implementations, a time window can be determined for acceptance of an old key, which can be set according to the desired implementation. In this manner, the receiver can determine which key to utilize based on the window and the tag received. Upon expiration of the time window, the receivers can continue with the new encryption scheme based on the new tag and the new key.

In additional example implementations, if the key has not been received yet but the CE is expecting a key change (e.g. expiration of the valid time period of the old key), the CE may also be configured to delay decryption and encryption operations of ciphertext until the new key is received. However, depending on the desired implementation, the CE may also be configured to continue with the old key and encryption scheme based on the old tag even upon expiration, whereupon the CE will switch to the new key and the new encryption scheme based on the new tag upon receipt.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising, by a computing system:
   at a first time, receiving a first key to be used by one or more cipher engines on the computing system to perform decryption based on a cryptographic scheme;
   at a second time subsequent to the first time, receiving a second key to be used by the one or more cipher engines on the computing system, instead of the first key, to perform the decryption based on the cryptographic scheme, after an expiration time at which the first key has expired, wherein the one or more cipher engines are further configured to perform encryption, using the first key and the second key, based on the cryptographic scheme;
   receiving an announcement;
   based on the announcement, setting a time window beyond the expiration time of the first key for acceptance of messages encrypted using the first key and messages encrypted using the second key; and,
   during the time window and after the first key has expired, when the second key has not been received, executing the one or more cipher engines to continue to perform encryption operations using the first key until the second key is received, and,
   after the second key has been received,
      maintaining the expired first key and the second key,
      in response to receiving a message encrypted using the first key, executing the one or more cipher engines to decrypt the message, using the first key, based on the cryptographic scheme, and,
      in response to receiving the message encrypted using the second key and receiving the second key, executing the one or more cipher engines to decrypt the message, using the second key instead of the first key, based on the cryptographic scheme.

2. The method of claim 1, wherein the first key and the second key are private keys.

3. The method of claim 1, further comprising, during the time window, in response to receiving the encrypted message using the second key and before the second key has been received, delaying decryption of the encrypted message by the one or more cipher engines until the second key is received.

4. The method of claim 1, wherein the method further comprises, during the time window, when a message is received, retrieving the first key or the second key to be used for decryption by matching a tag associated with the message to the first key or the second keys.

5. The method of claim 4, wherein, after expiration of the time window, the received message is configured to be decrypted without the first key.

6. The method of claim 1, wherein setting of the time window comprises receiving, prior to the expiration time, the expiration time at which the first key is to expire, and setting the time window based on the received expiration time.

7. The method of claim 1, wherein the method further comprises, by the computing system, for each of one or more messages to be sent to another computing system:
   executing the one or more cipher engines to encrypt the message using the first key to provide a first encrypted message;
   executing the one or more cipher engines to encrypt the message using the second key, based on the cryptographic scheme, to provide a second encrypted message; and
   sending the first encrypted message and the second encrypted message to other computing system, such that the message can be decrypted by the other computing system from at least one of the first encrypted message and the second encrypted message before, during, or after the time window.

8. A non-transitory computer-readable medium having instructions stored that are executed on a processor, the instructions comprising:
   at a first time, receiving a first key to be used by one or more cipher engines on a computing system to perform decryption based on a cryptographic scheme;
   at a second time that is subsequent to the first time, receiving a second key to be used by the one or more cipher engines on the computing system, instead of the first key, to perform the decryption based on the cryptographic scheme, after an expiration time at which the first key has expired, wherein the one or more cipher engines are further configured to perform encryption, using the first key and the second key, based on the cryptographic scheme;
   receiving an announcement;
   based on the announcement, setting a time window beyond the expiration time of the first key for acceptance of messages encrypted using the first key and messages encrypted using the second key; and,
   during the time window and after the first key has expired, when the second key has not been received, executing the one or more cipher engines to continue to perform encryption operations using the first key until the second key is received, and,
   after the second key has been received,
      maintaining both the expired first key and the second key,
      in response to receiving a message encrypted using the first key, executing the one or more cipher engines to decrypt the message, using the first key, based on the cryptographic scheme, and,
      in response to receiving the message encrypted using the second key and receiving the second key, executing the one or more cipher engines to decrypt the message, using the second key instead of the first key, based on the cryptographic scheme.

9. The non-transitory computer-readable medium of claim 8, wherein the first key and the second key are private keys.

10. The non-transitory computer-readable medium of claim 8, wherein the instructions further comprise, during the time window, when the message encrypted using the second key has been received and the second key has not been received, delaying decryption of the message by the one or more cipher engines until the second key is received.

11. The non-transitory computer-readable medium of claim 8, wherein the first key is received in association with a first tag that represents a purpose, wherein the second key is received in association with a second tag that is different than the first tag and represents the purpose, and wherein the instructions further comprise, during the time window, when a message is received, retrieving the first key or the second key to be used for decryption by matching a tag associated with the message to the first key or the second key.

12. The non-transitory computer-readable medium of claim 11, wherein the instructions further comprise, after expiration of the time window, the received message is configured to be decrypted without the first key.

13. The non-transitory computer-readable medium of claim 8, wherein setting of the time window comprises receiving, prior to the expiration time, the expiration time at which the first key is to expire, and setting the time window based on the received expiration time.

14. The non-transitory computer-readable medium of claim 8, wherein the instructions further comprise, for each of one or more messages to be sent to another computing system:
- encrypting the message using the first key to provide a first encrypted message;
- encrypting the message using the second key to provide a second encrypted message; and
- sending the first encrypted message and the second encrypted message to other computing system, such that the message can be decrypted by the other computing system from at least one of the first encrypted message and the second encrypted message before, during, or after the time window.

\* \* \* \* \*